April 18, 1933. B. H. MILLER 1,904,503
CHAIN GRATE STOKER
Filed May 28, 1928 5 Sheets-Sheet 4
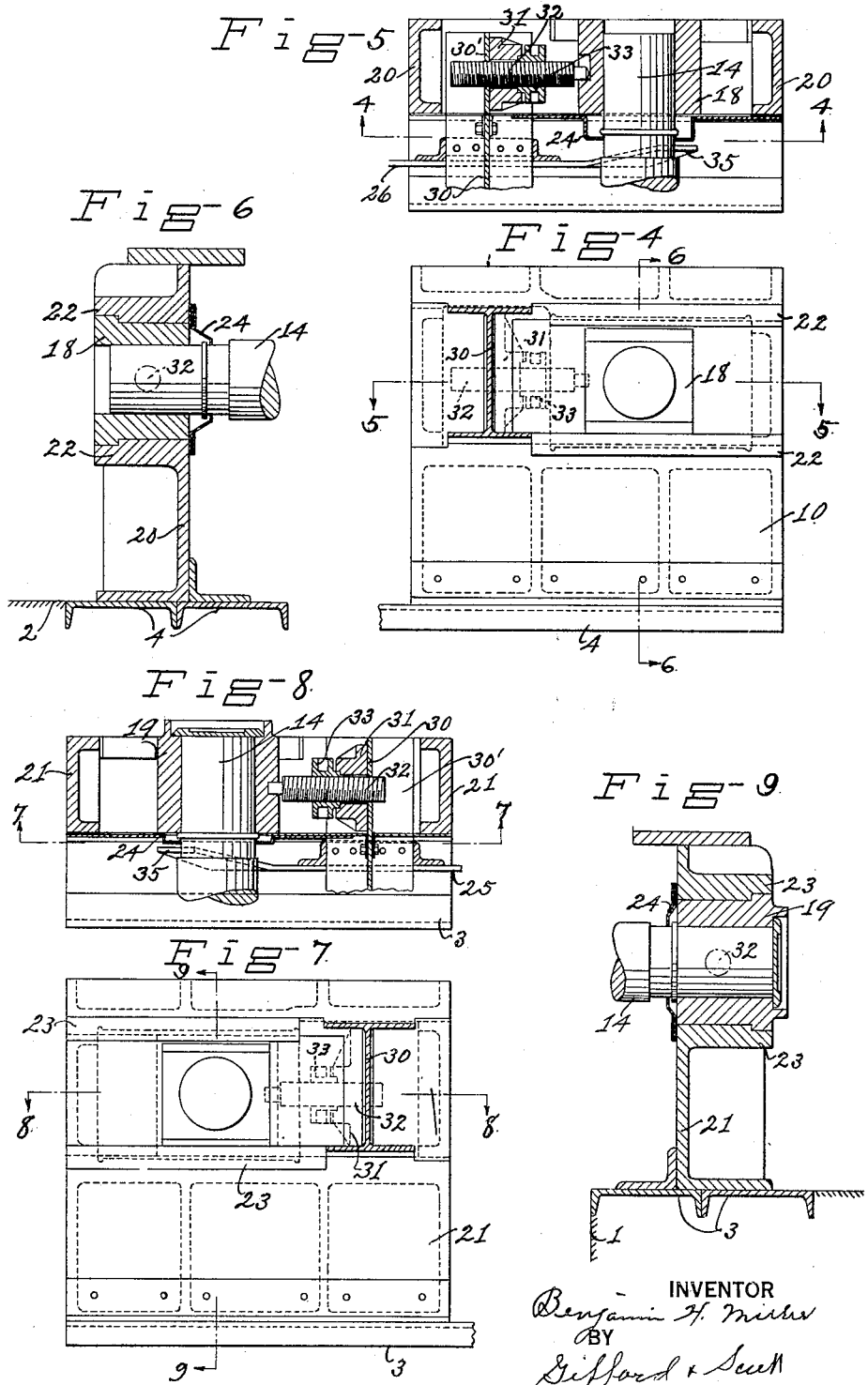
INVENTOR
Benjamin H. Miller
BY
Gifford & Scott
ATTORNEYS

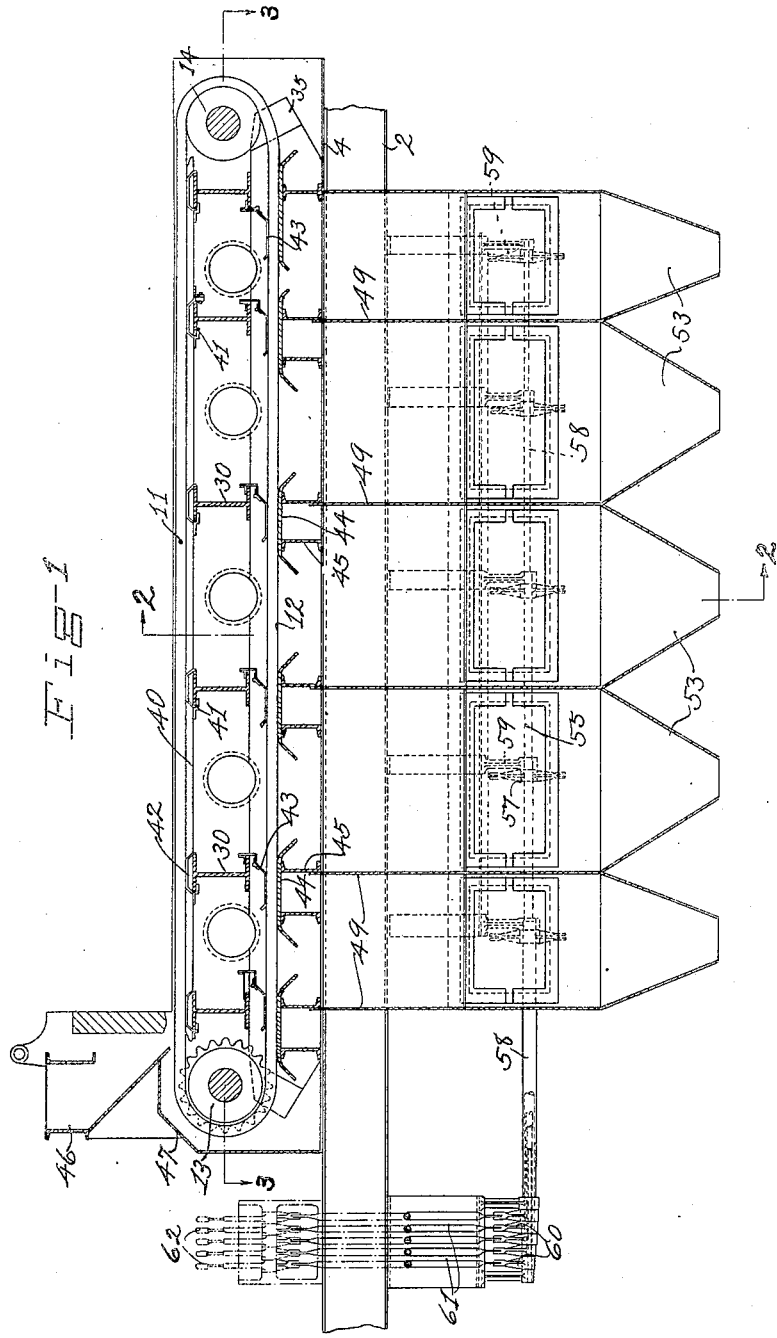

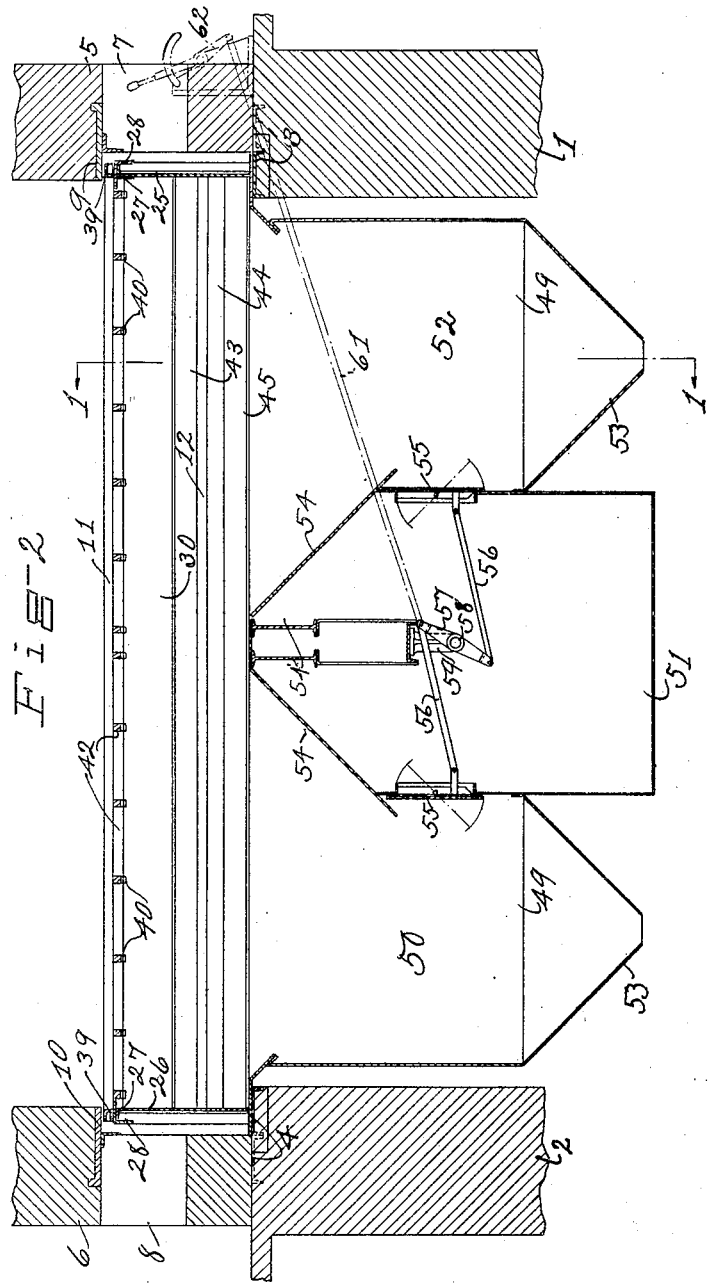

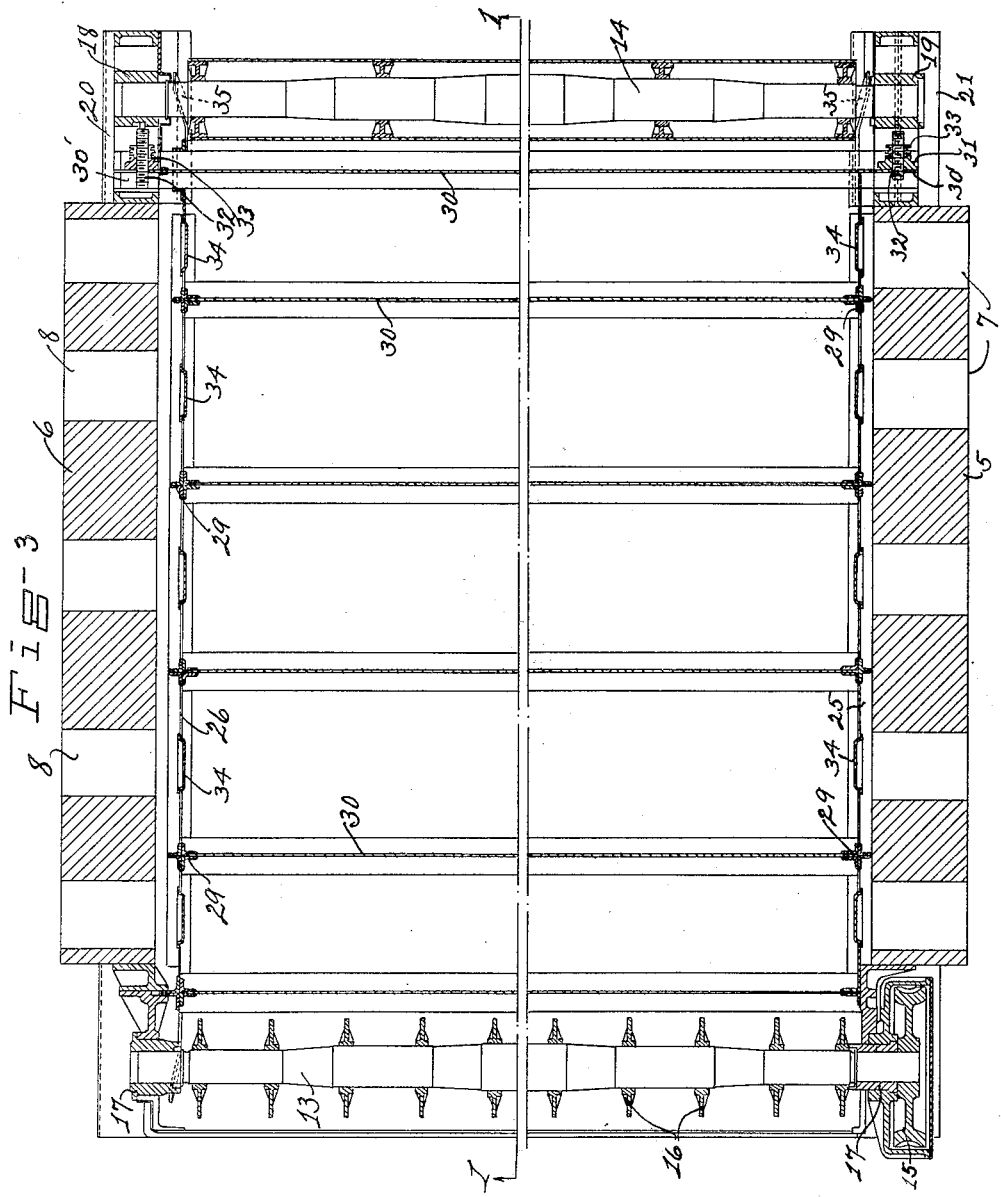

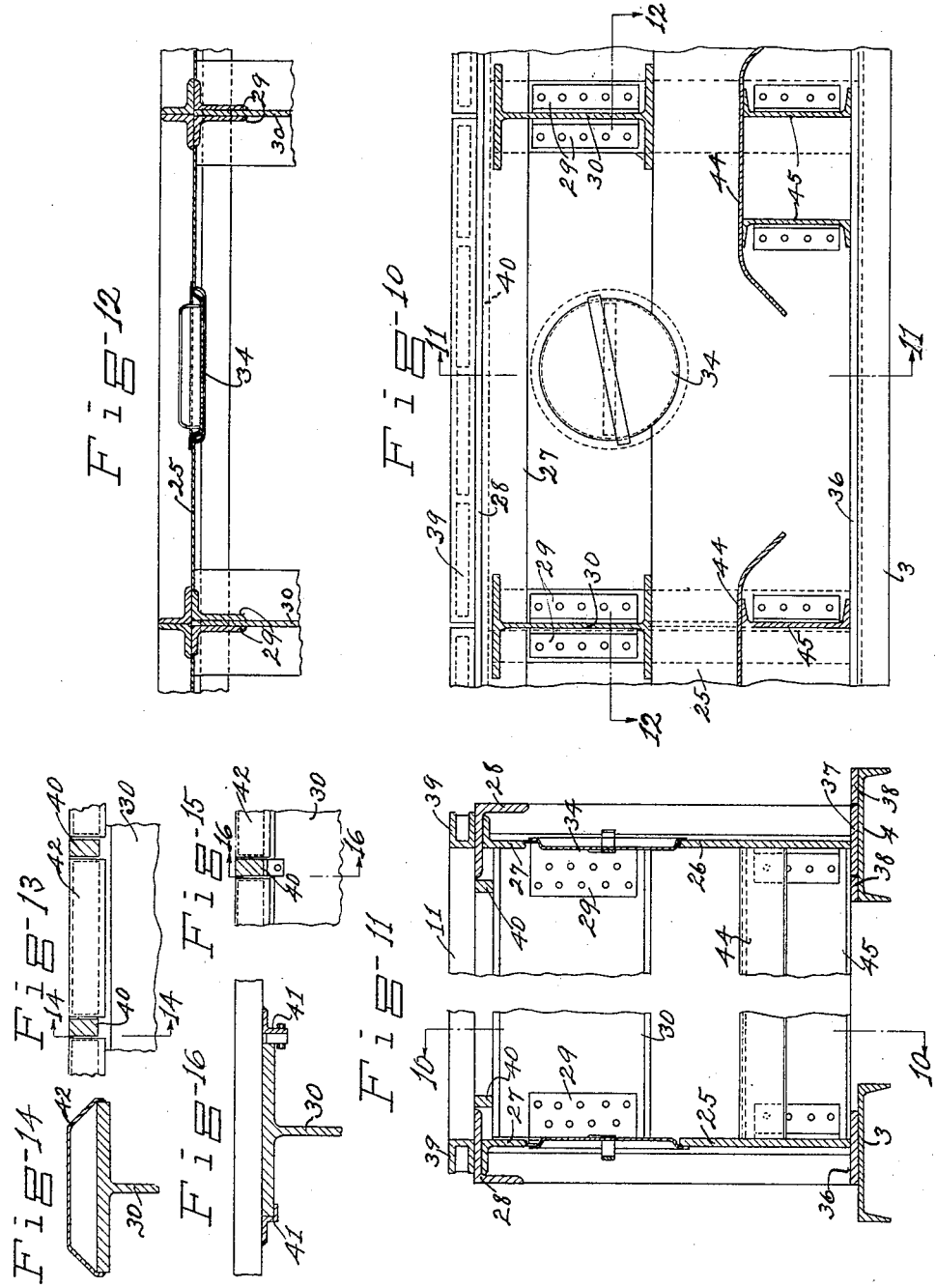

Patented Apr. 18, 1933

1,904,503

UNITED STATES PATENT OFFICE

BENJAMIN H. MILLER, OF WADSWORTH, OHIO, ASSIGNOR TO THE BABCOCK & WILCOX COMPANY, OF BAYONNE, NEW JERSEY, A CORPORATION OF NEW JERSEY

CHAIN GRATE STOKER

Application filed May 28, 1928. Serial No. 281,023.

This invention relates to a chain grate stoker that is provided with a center forced blast duct beneath the stoker, and will be understood from the description in connection with the accompanying drawings, in which Fig. 1 is a longitudinal section through the device taken along the line 1—1 of Fig. 2; Fig. 2 is a section along the line 2—2 of Fig. 1; Fig. 3 is a horizontal section along the line 3—3 of Fig. 1; Fig. 4 is a vertical section showing one of the details, taken along the line 4—4 of Fig. 5; Fig. 5 is a horizontal section along the line 5—5 of Fig. 4; Fig. 6 is a vertical section along the line 6—6 of Fig. 4; Fig. 7 is a section similar to Fig. 4, showing more of the details and is taken along the line 7—7 of Fig. 8; Fig. 8 is a horizontal section along the line 8—8 of Fig. 7; Fig. 9 is a vertical section along the line 9—9 of Fig. 7; Fig. 10 is a vertical section on an enlarged scale, partly broken away, taken along the line 10—10 of Fig. 11; Fig. 11 is a vertical section along the line 11—11 of Fig. 10; Fig. 12 is a horizontal section along the line 12—12 of Fig. 10; Fig. 13 is a vertical section, partly broken away, showing some of the details; Fig. 14 is a section along the line 14—14 of Fig. 13; Fig. 15 is a section similar to Fig. 13 showing some of the details, and Fig. 16 is a section along the line 16—16 of Fig. 15.

In the drawings, reference characters 1 and 2 (Fig. 2) represent foundations along opposite sides of the stoker in which metal plates 3 and 4 are located near the upper surface thereof. The brick work side walls of the stoker are shown at 5 and 6 and access openings 7 and 8 are provided through these side walls. Ledge plates 9 and 10 are anchored in the side walls 5 and 6 and extend slight distances over the edges of the upper run 11 of the chain grate.

The front and rear shafts of the chain grate are shown at 13 and 14, respectively. The front shaft 13 (Fig. 3) is provided with a gear 15 by which it may be driven from any convenient source of power and is also provided with sprockets 16 for the chain grate. The front shaft 13 is mounted in fixed bearings 17. Slidable bearings 18 and 19 (Figs. 3 to 9) are provided for the rear shaft 14. These bearings 18 and 19 are slidable in fixed supports 20 and 21 along guides 22 and 23 provided for this purpose. Metal seal plates 24 are provided around the shaft 14 bearing against the supports 20 and 21.

Vertical metal side frames 25 and 26 for the stoker extend from the shaft 13 to the shaft 14. Longitudinal angles 27 and 28 (Figs. 10 and 11) extend along the upper edges of the side frames 25 and 26. One edge of each angle 28 extends under the edges of the upper run 11 of the chain grate and seals are thereby formed along the under edges of the same. Vertical angle bars 29 (Figs. 3, 10, 11 and 12) are attached to the side frames 25 and 26 at intervals to retain cross girders 30 which extend across the stoker. The ends 30' of the rearmost cross girder 30 extend outwardly beyond the side frames 25 and 26. Metal pads 31 are located on the sides of the extending ends 30' toward the rear shaft 14 and adjusting screws 32 that are provided with nuts 33 extend through these pads 31 and the extending ends 30' of the cross girder 30. The rear ends of the screws 32 press against the slidable bearings 18 and 19 so that, as the side frames 25 and 26 expand in accordance with the expansion of the chain grate passing around the shafts 13 and 14, the rear shaft 14 is moved to keep the chain grate taut.

Access holes are provided in the side frames 25 and 26 corresponding to the access holes 7 and 8 in the side walls 5 and 6 and the access holes in the side wall frames are closed by means of circular doors 34. Extensions 35 are provided at the rear ends of the side frames 25 and 26 and are bent outwardly and project under and beyond the rear shaft 14. Longitudinal bars 36 and 37 (Fig. 11) are provided along the lower edges of the side frames 25 and 26 and slide along the plates 3 and 4 of the foundations. The plate 37 slides in a groove between two side strips or guide bars 38 that are attached to the plate 4 so that the plate 37 can slide only longitudinally while the plate 36 is permitted to slide both longitudinally and laterally. Longitudinal guide bars 39 (Figs. 2, 10 and 11) are provided along the upper sides of the angles 28 with which guide bars the edges of the upper run 11 of the chain grate contact. Longitudinal skid bars 40 (Figs. 1, 2, 10, 11 and 13) are provided for the upper run 11 of the chain grate and are attached to the upper edges of the cross girders 30 by means of the clips 41 (Figs. 1 and 16). Seals 42 are provided along the top edges of the girders 30 between the skid bars 40 and seals 43 are provided along the lower edges of the girders 30 between those girders and the upper side of the lower run 12 of the chain grate. The drag plate for the lower run 12 of the chain grate is divided into sections 44 (Figs. 1 and 10) that are mounted on cross channel bars 45.

A coal hopper 46 is provided through which coal is fed onto the front end of the chain grate and a housing 47 extends around the front end of the stoker.

Three longitudinal ducts 50, 51 and 52 (Figs. 1 and 2) extend beneath the stoker, the ducts 50 and 52 receiving the siftings from the chain grate and being provided with hoppers 53 for discharge of the siftings. The ducts 50 and 52 are divided by means of transverse partitions 49 into the same number of compartments as the cross girders 30 divide the space between the runs of the chain grate. The central duct 51 is for forced air that may be introduced under pressure in any convenient manner. The roof 54 of the duct 51 slopes inwardly from opposite sides to longitudinal girders 54', the upper edges of which are on a level with the foundations 1 and 2. Dampers 55 are provided in the side walls of the duct 51 and are operated by rods 56 connected to arms 57 on revoluble shafts 58 mounted in bearings or supports 59. The shafts 58 are nested (Fig. 1) and are of different lengths to extend to the dampers 55 in the respective compartments. The extending ends of the shafts 58 are provided with arms 60 that are connected by operating rods 61 to the operating rods or handles 62.

The chain grate and the side frames 25 and 26 expand and contract simultaneously so that the chain grate is kept at proper tension and the adjusting screws 32 can be adjusted to compensate for differences. The handles 62 can be adjusted to different positions, thus regulating the pressure in the several compartments beneath the stoker. The air from the conduit 51 passes first through the lower run of the stoker, thus cooling the same and the air that is heated thereby then passes through the upper run of the stoker and the coal bed thereon. The lower run of the stoker is unsupported at intervals so that there is a slight weaving movement of the same which will allow more of the siftings to drop out than would be the case if the chain traveled in one plane. The blast boxes or air ducts at the sides of the stoker are dispensed with.

I claim:

1. In a chain grate stoker, a longitudinal air duct beneath said stoker, and means for admitting air from said duct through the lower run of the chain grate and thence through the upper run thereof, said means comprising a duct located along side of said air duct and divided into compartments.

2. In a chain grate stoker, a longitudinal air duct beneath said stoker, and means for admitting air from different portions of said air duct and thence through corresponding portions of the lower and upper runs of the chain grate, said means comprising a duct located along side of said air duct and divided into compartments.

3. In a chain grate stoker, means for dividing the stoker into compartments, an air duct below said stoker, and means for admitting air from different portions of said duct into different compartments through the lower run of the chain grate, said means comprising a duct located along side of said air duct and divided into compartments.

4. In a chain grate stoker, longitudinal ducts below the chain grate, means for supporting the lower run at intervals to permit a weaving motion of the same as it operates and cause the siftings to drop into said ducts, and an air duct between said longitudinal ducts.

5. In a chain grate stoker, a chain grate shaft mounted in slidable bearings, metallic side frames with mountings therefor, at least one of said mountings having a groove, and connections between said bearings and frames and incorporating means whereby said bearings may be moved, one of said frames sliding in said groove.

6. In a chain grate stoker, a chain grate shaft mounted in slidable bearings, metallic side frames with mountings grooved for movement of said frames as hereinafter set forth, and connections between said bearings and frames to permit said bearings to be moved, one of said frames sliding in a groove and the other one being movable both laterally and longitudinally of said stoker.

7. In a chain grate stoker, means for dividing the grate surface comprising the upper run of the chain grate for said stoker into sections in which the rate of air supplied for combustion may be varied, a longitudinal air duct beneath said stoker and means for admitting a regulated amount of air from said duct through the lower run of said chain grate and thence through said sections of the upper run, said means comprising compartments at the side of said duct and beneath said sections with adjustable dampers between said duct and said compartments.

8. In combination with a chain grate stoker, means between the stoker runs dividing the same into sealed compartments, means below the lower stoker run and divided into supply compartments for the aforesaid sealed compartments, and controlled means for admitting air to said lower compartments whereby air admission through the lower run of the stoker is controlled.

BENJAMIN H. MILLER